United States Patent [19]

Courduvelis

[11] Patent Number: 4,600,699
[45] Date of Patent: Jul. 15, 1986

[54] RECLAMATION OF A PALLADIUM-TIN BASED ELECTROLESS PLATING CATALYST FROM THE EXHAUSTED CATALYST SOLUTION AND ACCOMPANYING RINSE WATERS

[75] Inventor: Constantine I. Courduvelis, Orange, Conn.

[73] Assignee: Enthone, Incorporated, West Haven, Conn.

[21] Appl. No.: 465,909

[22] Filed: Feb. 14, 1983

[51] Int. Cl.$^4$ .................. B01J 38/68; B01J 23/96; C23C 16/06
[52] U.S. Cl. ................................. 502/24; 106/1.11
[58] Field of Search .............. 502/24, 25; 423/22; 106/1.11

[56] References Cited

U.S. PATENT DOCUMENTS 4,187,198  2/1980  Zeblisky ..................... 106/1.11

FOREIGN PATENT DOCUMENTS 2742777  3/1978  Fed. Rep. of Germany ..... 106/1.11

Primary Examiner—P. E. Konopka
Attorney, Agent, or Firm—John J. Tomaszewski; Kenneth A. Koch

[57] ABSTRACT

A method for the recovery and reuse of an expensive palladium-tin catalyst whereby alkali hydroxide or carbonate is added to the exhausted catalytic solution and/or the spent rinse water solution to precipitate out a catalyst residue, which is then filtered, collected, washed, and dissolved in a hydrohalide acid and adjusted to a predetermined concentration.

11 Claims, No Drawings

RECLAMATION OF A PALLADIUM-TIN BASED ELECTROLESS PLATING CATALYST FROM THE EXHAUSTED CATALYST SOLUTION AND ACCOMPANYING RINSE WATERS

BACKGROUND OF THE INVENTION

This invention relates to electroless metal deposition processes, and more particularly, to a method for the regeneration of a valuable palladium-tin catalyst from the exhausted original catalytic solution and its rinse water solution.

DESCRIPTION OF THE PRIOR ART

Electroless metal deposition is related to the art of forming a chemical deposition of an adherent metal coating on a desired substrate in the absence of an external electric source. This plating technique has been and is being used in a variety of applications, particularly in the production of printed circuit boards and the decorative plating of plastic surfaces. Prior to the electroless, or "autocatalytic" plating, the substrate to be plated is immersed in a catalytic solution, such as one prepared by a reaction of palladium and tin salts according to the teachings of one or more U.S. Pat. Nos. such as Shipley, 3,011,920, or Zeblinsky, 3,672,923. After immersion in one of these solutions, a catalytic layer forms on the surface of the substrate and will initiate autocatalytic plating, permitting the deposition of a uniform metal film on the substrate.

During plating, the catalyst "activator" solution becomes weakened due to depletion of the catalyst ingredients, such as absorption of the catalyst onto the surface of the processed substrate, and "drag out" of the catalytic solution into the adjoining rinse tank. Traditionally, the art has replenished the strength of the catalytic bath by making periodic additions of fresh catalyst activator solution. By this method, a predetermined volume of the spent operating solution is taken out in order to create sufficient room for the concentrated replenishing solution. The removed solution, known as "bail out", is waste water and must also be disposed of in an environmentally acceptable manner.

The art has long been aware that recovery of the exhausted catalyst would be a substantial economic benefit, yet no such technique for doing so currently exist. Several attempts have been directed at developing a reclamation process for palladium, even though the economic value of palladium is only a fraction of the value of the palladium based plating catalyst. Currently, however, no process for reclaiming followed by recycling the original palladium-tin catalyst to be reused as catalyst activator solution is known to the art.

Accordingly, it is an object of the present invention to discover a process for the effective recovery of a precious metal-tin based electroless plating catalyst from waste catalytic activator solution.

It is another object of the invention to develop a process for the efficient, economical recovery of a substantial portion of a spent palladium-tin electroless plating catalyst from the waste rinse water.

SUMMARY OF THE INVENTION

These and other objects of the invention have been achieved, and in accordance with the purposes as embodied and described, the present invention relates to a method for the reclamation and reuse of a precious metal-tin electroless plating catalyst, and particularly, a palladium-tin catalyst, from an aqueous, and preferably exhausted electroless plating "activator" solution, together with the waste water containing spent catalyst solution, comprising adding a sufficient amount of an effective base, preferably an alkali metal hydroxide or carbonate or an alkali salt of a weak inorganic or organic acid such as sodium acetate or $Na_2CO_3$, to both aqueous catalyst solutions whereby the pH is raised to a value at least sufficient to permit the catalyst to precipitate out of solution to form a residue, the solution having a pH at least about 1, and preferably, about 5 to 8. Upon completion of precipitating the palladium-tin residue out of solution, the residue is collected and filtered, preferably having first been washed of impurities. The collected precipitate residue is dissolved in an effective amount of a hydrohalide acid, preferably HCl, and the resulting solution is adjusted to the desired strength, preferably about 2.0 to 6.0 g/l of palladium chloride.

Detailed Description of the Invention

The catalyst solutions which are desired to be recovered using the process disclosed herein can be prepared by several well known techniques in the art, most preferably those described in Shipley, U.S. Pat. No. 3,011,920, the disclosure of which is hereby incorporated by reference. Shipley teaches forming a colloidal catalytic solution by mixing an aqueous acid solution of palladium chloride, $PdCl_2$ with an acid solution of stannous chloride, thereby forming a reaction product which, after acceleration with an acid such as HCl, provides a sensitizing layer for the subsequent electroless plating of a metal, such as copper.

After plating for a suitable period, the catalyst solution weakens, due both to absorption of the active catalyst elements on the surface of the plated substrates, and also the losses created due to activator "drag out" into the nearby rinse tank. The art has responded to the problem of replenishing the spent catalyst in several ways. The most common one has been to periodically remove a predetermined volume of weakened catalyst solution, and replenish it with a substantially equal volume of concentrated catalyst solution, so that the electroless plating process can be maintained at a desired rate. The removed waste water or bail out has been disposed of, as the art has been unable to effectively utilize the waste solution, despite the fact that it still contains significant amounts of valuable catalytic elements. Another application of the present invention is the recovery of the activator present in the water, which was used to rinse the processed articles such as printed circuit boards or plastic substrates as they emerge from the activator tank.

Applicant has discovered a surprisingly simple method for the reclamation and subsequent reuse of, in the broadest embodiment of the invention, a precious metal-stannate electroless metal catalyst from the used catalyst solution and the waste rinse water. The invention comprises contacting the waste catalyst containing solutions with an effective base, preferably an alkali hydroxide or an alkali salt of a weak inorganic or organic acid, so as to precipitate out the precious metal catalyst, collecting and filtering the deposited catalyst residue so as to dewater the collected residue, then dissolving it in a solution of hydrohalide acid of effective strength and adjusting the resultant solution concentration so as to produce a concentrated precious metal-stannate catalyst solution substantially equivalent to the original catalytic solution.

After removal of the exhausted catalyst from the plating solution, it is treated with an effective amount of a base, which in the broadest embodiment can be selected from the class consisting of alkali hydroxide, such as sodium or potassium hydroxide, alkali salts of weak inorganic and organic acids, such as sodium and potassium carbonate or bicarbonate, sodium and potassium phosphate, sodium and potassium acid and diacid phosphate, sodium and potassium borate, sodium and potassium formate, acetate, oxalate, and the like.

The alkali metal hydroxides or carbonates, and, most preferably, NaOH or $Na_2CO_3$ are the preferred base. The base is preferably added to the solution while the solution is being agitated. It is preferred, but not critical, that the neutralization reaction takes place under a controlled oxygen free atmosphere, preferably either a nitrogen or carbon dioxide blanket, and the like.

The addition of the base precipitates the catalyst out as an insoluble mud like residue. As base is added to the solution, heat is generated from the exothermic neutralization reaction that occurs with the acid; thus, it is preferred to have a continuous slow addition of the base and cooling of the solution so as to control any temperature rise. The addition of base is continued until the precipitation of catalyst is completed, at which time the pH of the solution has risen above 1.0 and is between about 3 to 9, and, preferably, about 5 to 8.

When precipitation of the catalyst is completed, the addition of base is stopped, and the precipitate is preferably filtered and collected, although the precise mode of collection of the residue is noncritical. The precipitate is preferably also washed with distilled water to remove surface impurities. However, other washing fluids known to those in the art can also be use.

After the catalyst residue has been washed and collected, it is recycled back to the electroless plating bath for reuse in the catalyst solution. However, in the broadest embodiment of the invention, the treated residue can be stored for subsequent use. In the narrower mode of the invention, the catalyst filtrate residue is dissolved in a predetermined amount of an effective hydrohalide acid, most preferably hydrochloric acid, although an acid and a suitable chloride salt can be used. The catalyst residue is dissolved in the acid, and the acid concentration adjusted so as to produce a solution equal in activity to the stock concentrated catalyst solution originally used in the electroless plating bath.

In the preferred embodiment of the invention, both the spent catalyst solution and the rinse water containing catalyst are treated with increments of a solution of either sodium hydroxide or sodium carbonate of predetermined strength, the solution being mildly agitated during mixing, preferably under a controlled atmosphere, most preferably $N_2$ or $CO_2$. The controlled atmosphere prevents exposure of the solution of the air and thus prevents any potential oxidation of the divalent tin to the tetravalent state. The addition of base converts the palladium-tin catalyst into an insoluble, mud like residue; the base is slowly added until the precipitation is complete, at which time the pH of the solution is usually between about 5 to 8. When precipitation is complete, the precipitate is filtered and collected, washed with water, and processed to remove water from the remaining residue. The addition of a predetermined amount of HCl dissolves the precipitate into a black catalyst solution, which can then be adapted to the desired catalyst operating solution by diluting it either with aqueous HCl or an acid and chloride salt.

EXAMPLE I 38 liters of exhausted catalyst operating solution having an original concentration of catalyst which is used in a printed circuit manufacturing plant was reclaimed by first treating it with a 20% NaOH solution, which was added slowly while stirring under a blanket of nitrogen gas, so as to prevent oxidation of the divalent tin. The addition was continued until the precipitation of catalyst residue was complete, at which time the pH of the solution registered 6.8, and the temperature 111° F. The tin-palladium complex was converted to a sludge, which was then filtered through a Mafiac filter under pressure. The resulting solid residue was next dissolved in concentrated HCl, which produced a black solution, which was then filtered to remove any small impurities remaining, and made 4.7 liters having the following concentration:

| Element | Con. of Exhausted Solution (38 liters) | Reclaimed Catalyst Solution (4.7 liters) |
|---|---|---|
| Pd | 0.35 g/l | 2.24 g/l (77% recovered) |
| Sn | 5.50 g/l | 27.75 g/l (49% recovered) |
| Concentrated HCl | 21% present | 23% added |

The reclaimed solution was then brought to the concentration of the original plating catalyst, which is that sold under the trade name "Activator 433" a concentrate catalyst solution manufactured by Enthone, Incorporated of West Haven, Conn., which is diluted eight times before use as an operating solution.

The reclaimed catalyst solution was next evaluated for catalytic activity for the electroless plating of copper by a comparison with the stock "433" concentrate. In each case the concentrate was diluted with two volumes of HCl and 5 volumes of distilled water to make the following operating solution:

| Element | Stock Solution Control | Reclaimed Solution |
|---|---|---|
| Pd | 0.29 g/l | 0.27 g/l |
| Sn | 6.6 g/l | 3.2 g/l |
| HCl (37%) | 32% (3.2N) | 35% (3.5N) |

Coupons of printed circuit boards were stripped for two minutes in a 15% ammonium persulfate solution and then activated in both the diluted reclaimed catalyst and the diluted stock "443" solutions, next being post activated in Enthone's PA 491 post activator solution and plated in a high speed electroless copper bath kept at room temperature. Each coupon was completely covered with copper on both sides. After successfully repeating this treatment for 4 successive coupons, the experiment was repeated using the two catalyst solutions, each of which was diluted again by an equal volume of a solution of 2 parts $H_2O$:1 part HCl. Both baths successfully catalyzed the coupons so that the elctroless copper completely covered them.

The dilution of the solutions was repeated two more times, so as to produce a bath having a concentration ⅛th that of the original bath. After repeating the experiment the last time, both coupons were found to be only partially covered, indicating that the catalytic strength of the reclaimed activator solution is substantially equal to the original catalyst solution.

EXAMPLE II 15 liters of "rinse water" was first approximated by adding 90 ml of Enthone's "443" Activator solution to 15 liters of $H_2O$. This concentration (6 ml/l) would be a typical one found in a stagnant rinse after processing 3 to 4 loads of printed circuit boards; the pH of the resultant solution was 2.5. Slow additions of 10 ml of 50% of NaOH slowly raised the pH to 7.0, while the precipitate sludge settled on the bottom of the container, and the supernatant water was decanted off. The precipitate was vacuum filtered and then dissolved in concentrated HCl to produce 90 ml of catalyst solution.

| Element | Original "443" Solution | Reclaimed Solution |
|---|---|---|
| Pd | 0.18 g/l | 0.16 g/l |
| Sn | 4.6 g/l | 2.7 g/l |

EXAMPLE III

A 70 liter rinse water solution of 25%, "443" Activator was treated with an equal volume of a 200 g/l solution of $Na_2CO_3$, which brought the pH of the solution to about 7.0. The mixing of the base occurred without a temperature rise, and took about 20 minutes, during which time large amounts of $CO_2$ gas evolved, thus creating an air free environment. The mixing space was kept air tight, and the $CO_2$ was vented into a water trap from where it could escape into the atmosphere without permitting air to return into the system. After neutralization of the solution was completed, the sludge was allowed to settle for a period of 4–5 hours, and the supernatant water was siphoned away and disposed of. After completion, fresh activator solution and $Na_2CO_3$ were added, and the process was repeated, until the residue of four successive netralizations had been collected. A Mafiac filter press was used to dewater the residue, and after the filtration was complete the precipitate was dissolved in concentrated HCl to produce a black catalyst solution, and filtered in order to remove a few insoluble impurities which were still present.

The reclaimed catalyst was next compared to a standard "443" activator solution, following a procedure whereby several coupons having printed circuit boards were first stripped and activated in the two solutions, which had been diluted to 12.5% concentration, and then postactivated in a postactivator bath. Next, the coupons were immersed in an electroless copper bath from which the coupons were withdrawn and inspected every few seconds to monitor the progress of their copper plating rate. The rate of coverage was substantially identical for coupons treated in either of the activator solutions, indicating equivalence of the two activator solutions.

Although the invention has been described and illustrated by reference to particular embodiments thereof, it will be understood that in its broadest aspects the invention is not limited to such embodiments, and that variations and substitution of such equivalents may be resorted to within the scope of the appended claims.

We claim:

1. A method for the reclamation for reuse of an electroless plating precious metal-tin catalyst from a weakened aqueous electroless plating activator solution and/or the spent rinse water solution comprising:

precipitating a precious metal-tin catalyst residue out of the solution by adding an effective amount of a base selected from the group of alkali hydroxides and alkali salts of weak-inorganic and organic acids to the weakened precious metal-tin catalyst activator solution and/or the spent rinse water solution; and filtering and collecting the precipitated residue from the solution.

2. A method as in claim 1 wherein the precipitated residue is further treated by:

(d) dissolving the residue in an effective amount of a hydrohalide acid; and (e) adjusting the resulting solution to a desired concentration.

3. A method as in claim 2 wherein the solution from step (e) is recycled back to the catalyst solution.

4. A method as in claim 1 or 2 wherein the solutions are kept under an oxidation resistant atmosphere during the addition of the base.

5. A method as in claim 4 wherein the oxidation resistant atmosphere is selected from the group consisting of nitrogen and $CO_2$ gases.

6. A method as in claim 1 or 2 wherein the base added is an aqueous solution selected from the group of alkali metal hydroxides and carbonates.

7. A method as in claim 1 or 2 wherein the precious metal is palladium.

8. A method as in claim 1 or 2 wherein the addition of the base in accompanied by a predetermined cooling of the solution so as to prevent a substantial temperature rise in the solution from occurring.

9. A method as in claim 1 or 2 wherein the addition of the base is continued until the pH of the solution has risen to about 5 to 8.

10. A method as in claim 1 or 2 wherein the hydrohalide acid is HCl.

11. A method as in claim 2 wherein the resulting regenerated solution is substantially equivalent in catalytic strength to the original catalyst solution.

* * * * *